Sept. 1, 1970 R. B. WAY 3,526,117
BAR FORMING MACHINE

Filed April 22, 1968 4 Sheets-Sheet 1

INVENTOR.
ROBERT B. WAY
BY
Charles L. Lovercheck
attorney

Sept. 1, 1970 R. B. WAY 3,526,117
BAR FORMING MACHINE

Filed April 22, 1968 4 Sheets-Sheet 2

INVENTOR.
Robert B. Way
BY
Charles L. Lovercheck

INVENTOR
ROBERT B. WAY

United States Patent Office 3,526,117
Patented Sept. 1, 1970

3,526,117
BAR FORMING MACHINE
Robert B. Way, 439 Vermont Ave., Erie, Pa. 16505
Filed Apr. 22, 1968, Ser. No. 723,005
Int. Cl. B21d 1/02
U.S. Cl. 72—165                                  11 Claims

ABSTRACT OF THE DISCLOSURE

A machine for straightening metal bars, especially triangular shaped metal bars that have at least three flat sides. Basically the machine has a row of first rolls parallel to each other supported on a rotatable member that can swing the rolls about an axis. The rotatable member is supported on the machine by a compound mechanism by which it can be moved both vertically and horizontally. A row of second rolls is supported above the first row on a frame. The frame is pivoted to the machine so that the axes of the second rolls have their axes fixed relative to each other but the rolls swing and float on the frame in an arc of fixed radius. Thus, when a bar having two nonparallel sides passes between the first rolls and second rolls one side of the bar will engage the first rolls and the second rolls will swing to a position to engage the second side of the bar. Since the second rolls float, they will move to a position where both first rolls and second rolls engage the bar over the entire width of the bar. A means is provided to restrain the bar from moving laterally from engagement with both the first and second rolls. In one embodiment, this is a third set of rolls. In another embodiment, this is a fiber strip which engages the widest edge of the bar. Where rectangular bars are to be straightened, a fiber strip can be attached on both sides. The bar can be either pushed or pulled through the straightener. By means of the compound up-and-down adjustment and the rotatable member, the straightener can be moved relative to the forming rolls sufficient to place a stress in the bar to compensate for and to stress the bar in a direction to remove any twist from the bar and to deliver the bar perfectly straight from the straightener.

When metal is rolled from a two roll mill, finished on three or more sides, the material tends to be drastically distorted and twisted. When pulled by a reel winder, this tends to straighten the metal. When the metal is pushed through a straightener for cut lengths, to have them perfectly straight is always a drastic problem. This invention clarifies this entirely.

It is, accordingly, an object of the invention to provide an improved machine for straightening metal into bars.

Another object of the invention is to provide a machine for straightening bars, which is simple in construction, economical to manufacture, and simple and efficient to use.

Another object of the invention is to provide an improved machine for straightening metal bars wherein the bar of metal is moved between three rows of rollers, two of which have their axes of rotation generally parallel to each other and the other row has its axis of rotation generally perpendicular to the rolls in the first row. Means is provided to vary the angle of the first row of rolls to the second row of rolls, and means is provided to rotate the several rows of rolls on the machine and further means is provided to shift the entire roll assembly laterally and vertically.

Another object of the invention is to provide a machine as described herein wherein the metal may be either pushed through the rolls or pulled therethrough and where two sets of rolls are supported in spaced relation to each other and where one set of rolls are freely swung on an axis perpendicular to the axis of the rolls.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
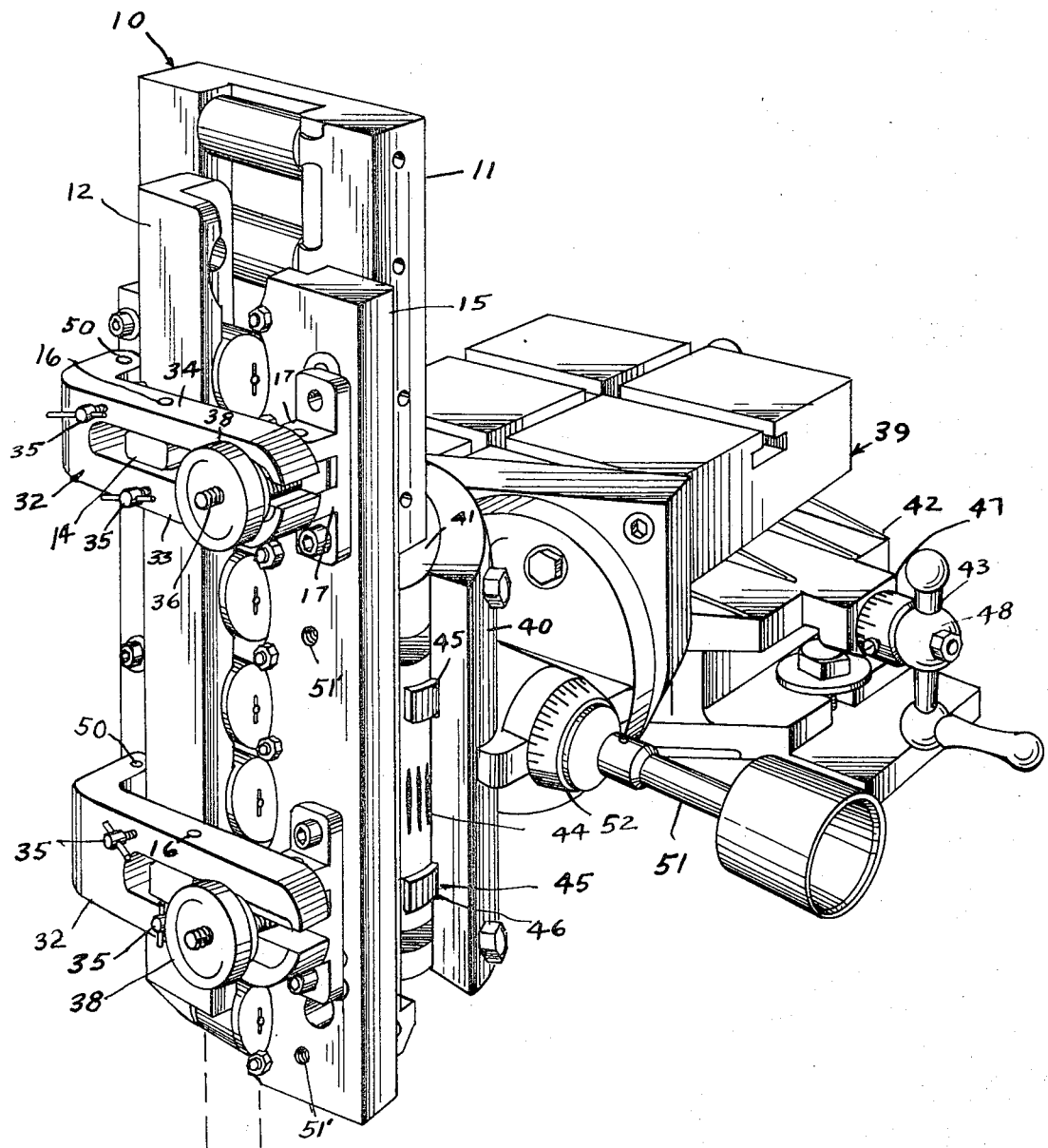
FIG. 1 is an isometric view of the fixture for use on the machine according to the invention.
Figure 2:
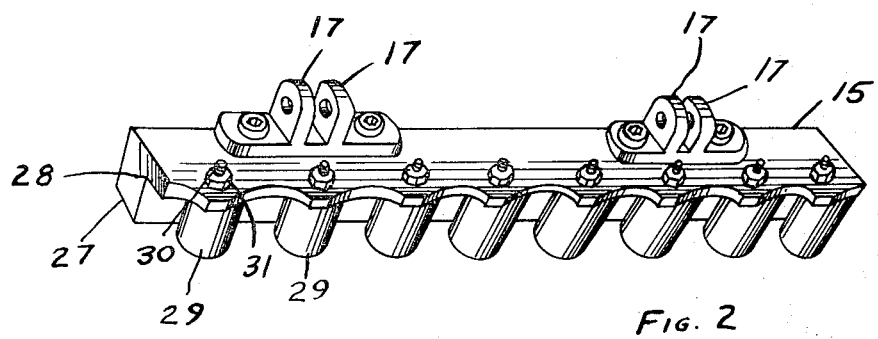
FIG. 2 is a view of the third rolls which in use have their axes of rotation perpendicular to the rolls shown in FIG. 3 and the rolls shown in FIG. 4.
Figure 3:
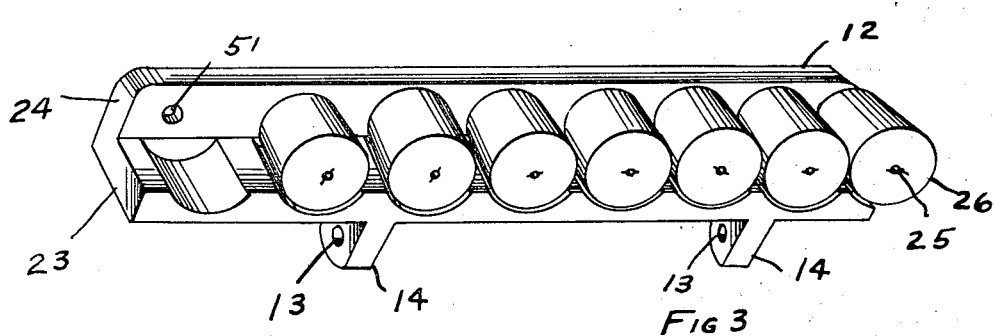
FIG. 3 shows a second roll assembly.
Figure 4:
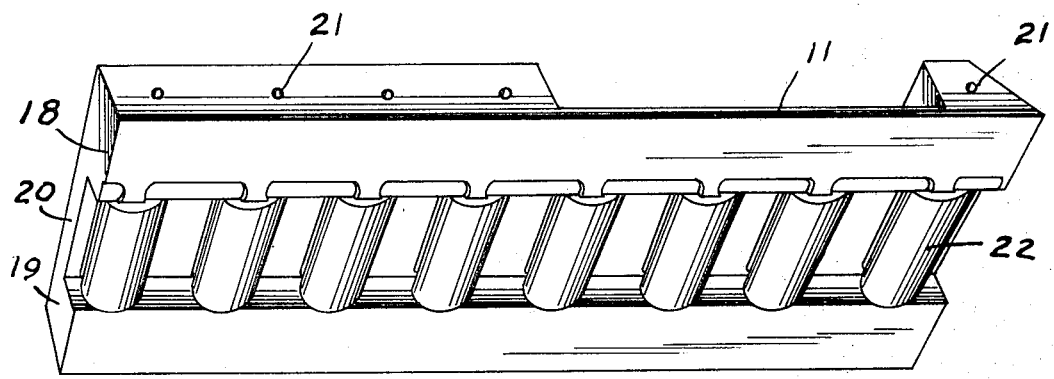
FIG. 4 shows a third roll assembly.
Figure 5:
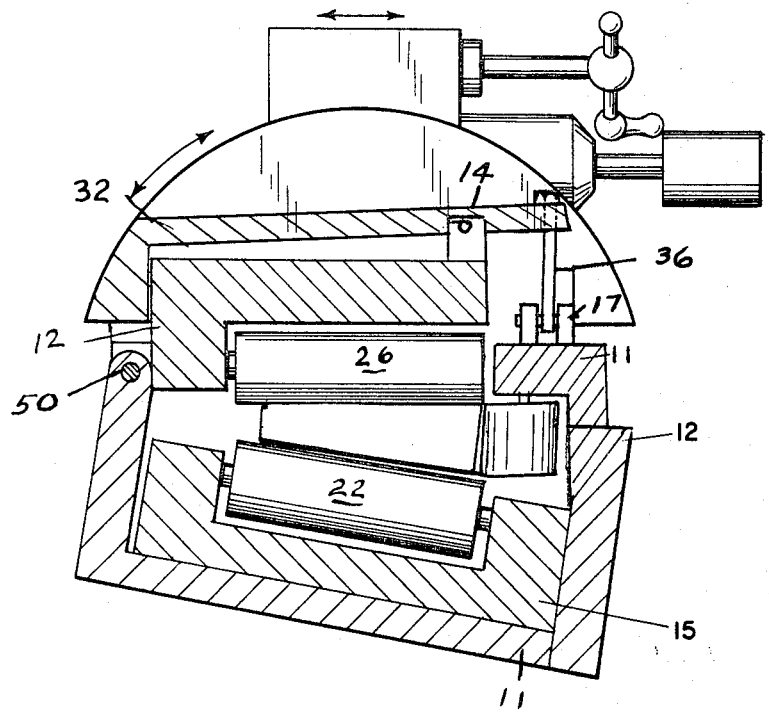
FIG. 5 is a longitudinal cross-sectional view through the rolls of the machine.

Now with more particular reference to the drawings, the machine is generally indicated at 10 and it has the first roll frame 11, second roll frame 12, and third roll frame 15. Holes 13 are formed in the lugs 14 in the roll assembly of the second roll frame 12. Holes 13 receive pins 16, which extend through holes 13 and through the brackets 32. Threaded members 36 are received between and pivoted to the spaced lugs 17 on the fixture frame. Threaded members 36 hold forming rolls 12 in place.

First frame 11 is fixed to member 41. Frame 11 has channel legs 18 and 19 fixed together by intermediate members 20. The channel legs 18 and 19 receive the rolls 22 between them. The axes of these rolls 22 are disposed in these legs 18 and 19. Pin holes 21 are formed in legs 18 and 19 for the axles of the rolls 22.

Second frame 12 is made up of angle legs 23 and 24 that support rolls 26. Angle legs 23 and 24 of the roll assembly 12 support the rolls 26 on axles 25. Lugs 14 are fixed to leg 23.

The angle legs 27 and 28 on the third roll member 15 are integral with each other. The lugs 17 are attached to the leg 28. Each of the two pairs of lug members 17 receive threaded member 36 between them. The third rolls 29 are rotatably supported on the leg 28 by axles 30 and held thereto by nut 31.

The brackets 32 and 33 are pivoted to the first roll frame 11 and have a bifurcated part which receives the lugs 14. Pins 16 extend through holes 13 in lugs 14 and through the holes in brackets 32 and 33, one pivoted to brackets 17 and their threaded part extends through the bifurcated part of brackets 32 and 33. The tension force by the nut 38 on the threaded member 36 opposing the force upward of the roll frame 12 holds the rollers from movement away from roll frame 11. However, roll frame 12 can swing on pins 16 so that the rolls 26 can adjust their axial position relative to the bars being straightened.

The compound 39 has a movable part and a fixed part. The movable part is in the form of a cylinder 41 having an outside surface that conforms to a part of the said cylinder. The cylindrical member 41 is rotatably received in the member 40 and the guide members 45 on the member 41 are received in slots 46.

Axial grooves 44 are formed in the outside of the cylindrical member 41, and those grooves engage suitable gearing fixed to the inner end of the shaft 51. Dials 52 are fixed to shaft 51 to indicate the position of shaft 51 so that the three roll frames 11, 12 and 15 can be adjusted about the central axis of the cylindrical member 41.

The compound 39 is similar to the well known compound tool support on a lathe. It has a fixed member and a movable member. The movable member may be moved laterally relative to the fixed member by means of the crank 48 having a crank member 43 on it. By a second crank arrangement, the member 39 can be moved vertically. The compound shown will be familiar to those skilled in the art since it operates exactly as a compound tool support on a conventional milling machine. The calibrated dial 47 provides a means to inspect the actual rotation of the crank so that it can be moved a very small amount at a time and with precision.

The copper bar 61 will be formed, for example, in rolls indicated by phantom lines 60. As it leaves forming rolls 60, the bar will be both bent and twisted. From rolls 60, the bar will be fed between rolls 22 and 29, as it moves between series of some eight rolls, the bar will be straightened. By means of handle 51, the roll forms 11, 12 and 15 can be swung about the axis of cylinder member 41 so that any twist in the bar can be removed, and by means of the compound, the rolls can be shifted vertically and horizontally to refine the straightening.

Those skilled in the art will note that the compound is of the general type used on machine tools, for example, and lathes whereby by means of cranks, including the crank 43 which can be rotated to move the parts of the compound relative to each other so that in the machine shown, the line of movement of the bar of metal can be moved one way or the other relative to the roll or other source from which it is fed from the forming rolls. In order to remove any twists and compensate for any twisting of the material, the handle 51 can be rotated. This will cause the cylindrical member 41 to rotate either clockwise or counterclockwise on the cylindrical member 41 which will compensate for twisting and thereby remove twists from the bar.

The handwheel or nut 38 can be tightened or loosened. This will allow the roller 29 to swing upward or downward, that is, toward or away from the rollers 22 to provide more or less force on the bar. The adjustment can be made by means of the set screw 35 which can be used to positively locate the rollers by supporting the bracket 32 against the downward force of the nut 38 on the bracket.

The rolls 22, 26, and 29 define a space therebetween through which the bar can move.

Figure 6:
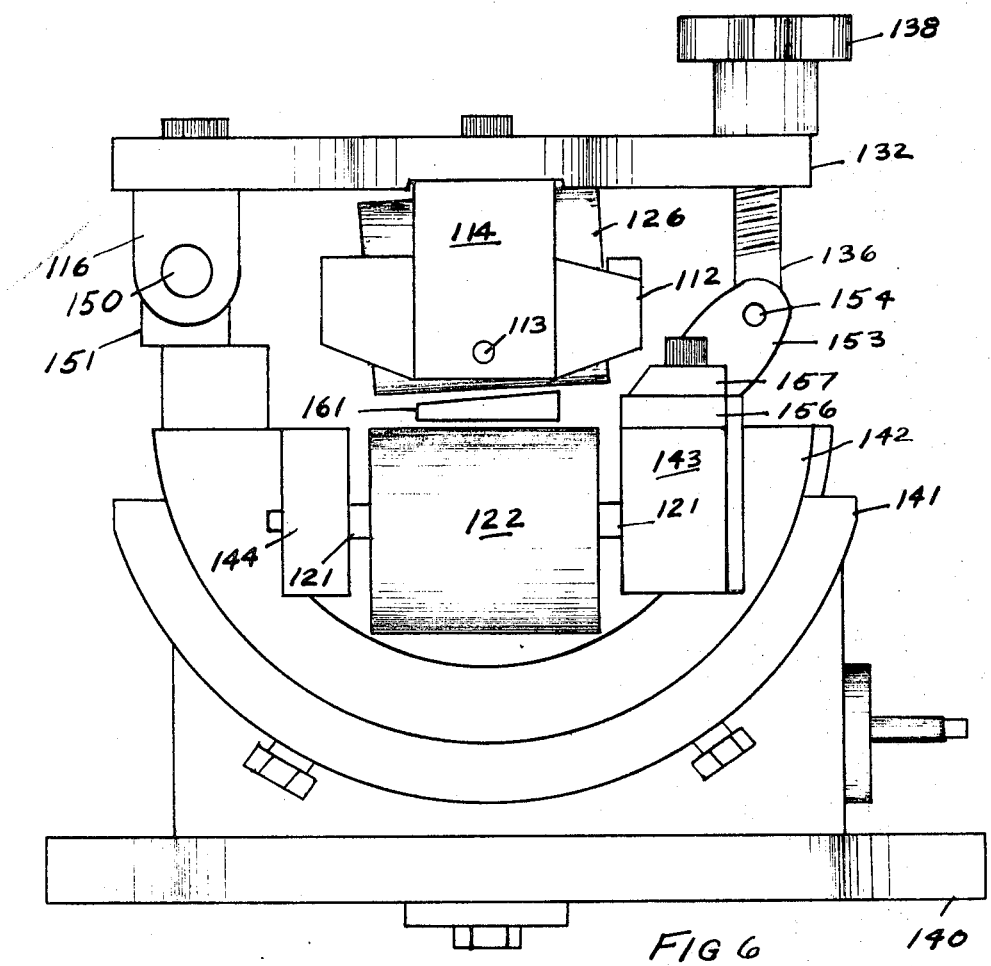
FIG. 6 is an end view of another embodiment of the invention.
Figure 7:
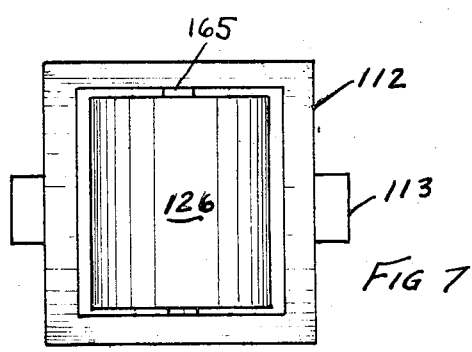
FIG. 7 is a side view of another embodiment of the invention.

Now with more particular reference to FIGS. 6 and 7, in that embodiment, the straightener shown has a compound indicated generally at 140 which has both horizontal and vertical movement relative to the bar 161 being straightened. The compound is controlled by suitable handles familiar to those skilled in the art, such as handle 48 shown in FIG. 1. The roll assembly is supported on the half cylindrical member 142 which is itself movable in a cylindrical path on the member 141. These members correspond to the members 40 and 41 in FIG. 1. Rails 143 and 144 are fixed to the member 142 and the first rolls 122 are rotatably supported on rails 143 and 144 by means of axles 121. The second rolls 126 are rotatably supported in boxes 112. These boxes each support one of the rolls 126 and each box is individually pivoted to the bracket 132 by means of downwardly extending U-shaped legs 114. Thus, the boxes 112 are pivoted to the legs 114 by axles 113 and each roll 126 is rotatable on axle 165 and is free to swing about the axles 113 so that the roll can adjust itself to the upper surface of the bar 161 being straightened. There will normally be three rolls 122 and four rolls 126. The axles of rolls 126 are spaced midway between the axles of rolls 122 so that each roll in one row tends to bend the bar 161 into the space between the two rolls next to it in the other row of rolls.

The bracket 132 has the downwardly extending bracket portion 116 which is fixed to the bracket 132 and is pivoted at 150 to the upwardly extending lug 151 which are fixed to member 142. The threaded member 136 is swingably supported between lugs 153 by pin 154 which rotatably attaches the threaded member 136 to the lugs 153. The nut 138 is received on the upper end of the threaded member 136 and it restrains the bracket 132 from upper movement. The nut can be adjusted to cause the rollers 122 and 126 to exert a force on the bar 161 at spaced positions and thereby straighten it.

A fiber strip 156 is sandwiched between the steel member 157 and the rail 143 and the fiber strip 156 forms a limit to restrain the bar 161 from moving away from the rolls 122 and 126.

In operation a bar from forming rolls will be passed between the rolls 122 and the rolls 126. The nut 138 will be adjusted downward to exert the correct force on the bar between the rolls 122 and 126 so that the bar will be deformed and deflected the right amount to remove bends from it. The fiber strip 156 will be fixed in position so that the bar 161 will slide along it. The rolls 126 will rock around the axles 113 so that they adjust themselves to the correct angularity of the bar 161. The operator can then adjust the position of the cylindrical member 142 relative to the member 141 by rotating the crank assembly as shown in FIG. 1 to remove all twists from the bar so that the bar will be properly stressed to remove such twists and the roll assembly can be moved vertically and horizontally to perfectly align the roll assembly with the forming rolls of the machine.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A fixture for straightening bars comprising
   a first frame member,
   first rolls supported on said first frame member, said first rolls being rotatable about axes that are parallel to each other and disposed in a common plane,
   a second frame member,
   second rolls,
   second roll support means supporting each said second roll for rotation about its central axis and means for supporting each said second roll support means on said second frame to permit said second rolls to swing about a common axis and to permit the axis of rotation of each said second rolls to move in a plane parallel to the plane in which each other said second roll axis moves,
   said second rolls being supported above spaces between said first rolls,
   means swingably connecting said second frame to said first frame at a first side of said first rolls and said second rolls,
   and locking means for locking said second frame to said first frame at a second side of said first rolls and at a second side of said second rolls,
   said first rolls and said second rolls being spaced from each other a sufficient distance to allow a bar to be straightened to be passed therebetween,
   said first rolls each being disposed below the space between each two said second rolls that are adjacent to each other.

2. The straightening fixture recited in claim 1 wherein means is provided to move said frames in a circular path, and compound means to move said first frame and said second frame in a direction generally parallel to the axis of rotation of said first rolls and in a direction perpendicular to the axis of rotation of said first rolls.

3. The fixture recited in claim 2 wherein said compound means comprises a first member fixed to said machine, a second member slidably supported on said first member and a third member slidably supported on said second member.

4. The fixture recited in claim 1 wherein said locking means comprises a threaded member swingably connected to said first frame, a hand engaging member threadably received on said threaded member and overlying said second frame, said threaded member being adapted to be tightened to move said second rolls toward said first rolls to decrease the space between said first rolls and said second rolls whereby a greater force may be exerted on a bar therebetween.

5. The fixture recited in claim 1 wherein guide means is provided on said fixture to guide said bar in a straight line between said first rolls and said second rolls.

6. The fixture recited in claim 5 wherein said guide means comprises a fiber strip.

7. The fixture recited in claim 5 wherein said guide means comprises third rolls, said third rolls being fixed to rotate about an axis of rotation of said first rolls whereby a bar will be guided in a straight line path between said first rolls and said second rolls.

8. The fixture recited in claim 5 wherein said guide means comprises a member made of a material softer than said bar adapted to engage said bar and to guide said bar through said fixture.

9. The fixture recited in claim 1 wherein said second roll support means comprises a plurality of box members, each said box member having two first sides and two second sides perpendicular to said first side and defining a rectangular space, a said second roll in each said space, each said second roll being supported on an axle attached to one of said first sides, each of said second sides being swingably attached to said second frame by a pivot means defining a pivot axis, said pivot axis of each said box being aligned with each other and perpendicular to the axis of rotation of said rolls.

10. The fixture recited in claim 9 wherein said pivot axis is disposed a substantial distance below the axis of rotation of said second rolls.

11. The fixture recited in claim 1 in combination with a metal forming machine, said metal forming machine comprising at least one forming roll adapted to have said bars move thereover and to move therefrom in curved condition, said first rolls being adapted to be disposed with their axis of rotation generally parallel to the axis of rotation of said forming roll.

References Cited

UNITED STATES PATENTS

| | | | |
|---|---|---|---|
| 790,706 | 5/1905 | Simmers | 72—164 |
| 2,318,160 | 5/1943 | Johnson | 72—165 |
| 2,517,309 | 8/1950 | Heller | 72—164 X |

MILTON S. MEHR, Primary Examiner